(12) United States Patent
Kumar

(10) Patent No.: US 8,095,368 B2
(45) Date of Patent: Jan. 10, 2012

(54) SYSTEM AND METHOD FOR VOICE AUTHENTICATION OVER A COMPUTER NETWORK

(75) Inventor: Saurabh Kumar, Jersey City, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 533 days.

(21) Appl. No.: 12/328,365

(22) Filed: Dec. 4, 2008

(65) Prior Publication Data

US 2010/0145709 A1 Jun. 10, 2010

(51) Int. Cl.
*G10L 17/00* (2006.01)
(52) U.S. Cl. ........................ 704/273
(58) Field of Classification Search ........... 704/273
See application file for complete search history.

(56) References Cited

U.S. PATENT DOCUMENTS

| | | | |
|---|---|---|---|
| 5,913,196 A * | 6/1999 | Talmor et al. | 704/270 |
| 5,930,804 A | 7/1999 | Yu et al. | |
| 6,292,782 B1 * | 9/2001 | Weideman | 704/273 |
| 7,212,613 B2 | 5/2007 | Kim et al. | |
| 7,340,042 B2 | 3/2008 | Cluff et al. | |
| 7,864,987 B2 * | 1/2011 | Venkatanna et al. | 382/115 |

OTHER PUBLICATIONS

Scott McGlashan et al., Voice Extensible Markup Language (VoiceXML) Version 2.0, W3C Recommendation Mar. 16, 2004, 196 pages.
Voice Verified, "Leaco Rural Telephone Co-op Selects Voiceverified to Protect Customers From Identity Fraud"; New Hope, PA, Nov. 12, 2007, 3 pages.

* cited by examiner

*Primary Examiner* — Susan McFadden

(57) ABSTRACT

Systems, computer-implemented methods, and tangible computer-readable media are provided for voice authentication. The method includes receiving a speech sample from a user through an Internet browser for authentication as part of a request for a restricted-access resource, performing a comparison of the received speech sample to a previously established speech profile associated with the user, transmitting an authentication to the network client if the comparison is equal to or greater than a certainty threshold, and transmitting a denial to the network client if the comparison is less than the certainty threshold.

20 Claims, 3 Drawing Sheets

SYSTEM AND METHOD FOR VOICE AUTHENTICATION OVER A COMPUTER NETWORK

BACKGROUND OF THE INVENTION

1. Field of the Invention

The present invention relates to voice recognition and more specifically to voice-based authentication.

2. Introduction

Many Internet and network applications require authentication for security purposes, such as online banking, online auction sites, online dating sites, online stock brokers, webmail, and countless others. Authentication is designed to reduce or avoid fraud by allowing access only to approved individuals. One current solution in the art is to authenticate based on username and password. One problem with usernames and passwords is that users can have too many to remember easily. Another problem is that malicious people can easily steal, copy, and, in some cases, guess usernames and passwords. Even in spite of these shortcomings, username/password combinations are very well entrenched in many secure Internet and network-based applications. Accordingly, what is needed in the art is a way to augment or replace current username/password approaches to authentication in order to reduce fraud and enhance security in network applications.

SUMMARY

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

Disclosed are systems, computer-implemented methods, and tangible computer-readable media for voice authentication. The method includes receiving a speech sample from a user through an Internet browser for authentication as part of a request for a restricted-access resource, performing a comparison of the received speech sample to a previously established speech profile associated with the user, transmitting an authentication to the network client if the comparison is equal to or greater than a certainty threshold, and transmitting a denial to the network client if the comparison is less than the certainty threshold. The user can capture and send the speech sample with a single user input, such as a single mouse click. A computing device running the Internet browser can preauthenticate the received speech sample before sending the speech sample to the server. The method can further include sending to the user with a prompt for an additional speech sample due to feigned poor speech recognition if the comparison is less than the certainty threshold, receiving the additional speech sample from the user, performing a second comparison of the additional received speech sample to the previously established speech profile associated with the user, and transmitting an authentication to the network client if the second comparison is equal to or greater than a certainty threshold.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only exemplary embodiments of the invention and are not therefore to be considered to be limiting of its scope, the invention will be described and explained with additional specificity and detail through the use of the accompanying drawings in which.

DETAILED DESCRIPTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Figure 1:
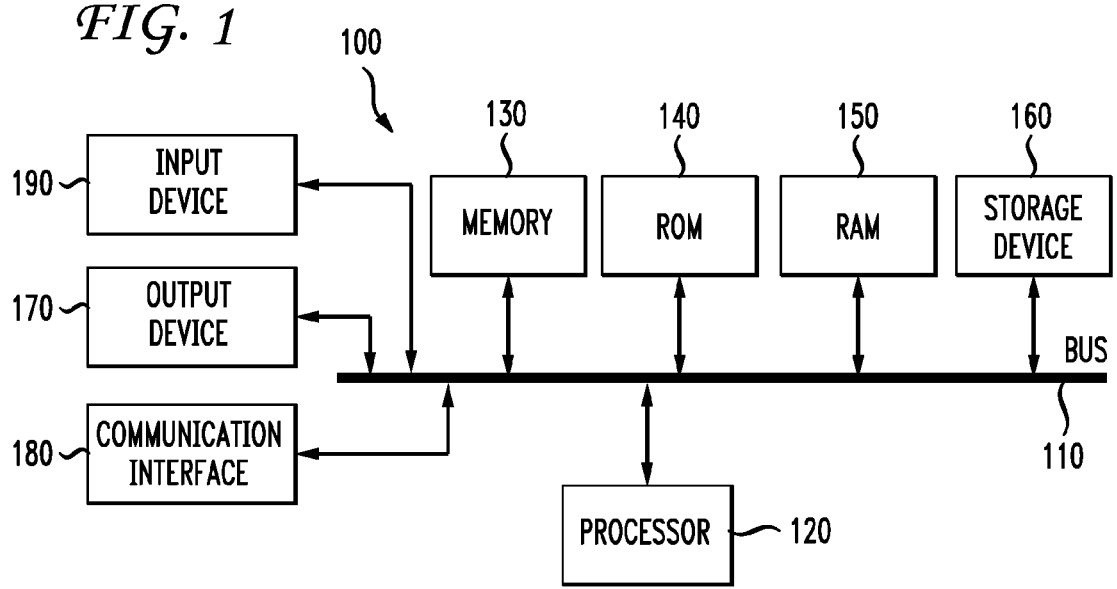
FIG. 1 illustrates an example system embodiment.

With reference to FIG. 1, an exemplary system includes a general-purpose computing device 100, including a processing unit (CPU) 120 and a system bus 110 that couples various system components including the system memory such as read only memory (ROM) 140 and random access memory (RAM) 150 to the processing unit 120. Other system memory 130 may be available for use as well. It can be appreciated that the invention may operate on a computing device with more than one CPU 120 or on a group or cluster of computing devices networked together to provide greater processing capability. A processing unit 120 can include a general purpose CPU controlled by software as well as a special-purpose processor. An Intel Xeon LV L7345 processor is an example of a general purpose CPU which is controlled by software. Particular functionality may also be built into the design of a separate computer chip. An STMicroelectronics STA013 processor is an example of a special-purpose processor which decodes MP3 audio files. Of course, a processing unit includes any general purpose CPU and a module configured to control the CPU as well as a special-purpose processor where software is effectively incorporated into the actual processor design. A processing unit may essentially be a completely self-contained computing system, containing multiple cores or CPUs, a bus, memory controller, cache, etc. A multi-core processing unit may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices such as a hard disk drive 160, a magnetic disk drive, an optical disk drive, tape drive or the like. The storage device 160 is connected to the system bus 110 by a drive interface. The drives and the associated computer readable media provide nonvolatile storage of computer readable instructions, data structures, program modules and other data for the computing device 100. In one aspect, a hardware module that performs a particular function includes the software component stored in a tangible computer-readable medium in connection with the necessary hardware components, such as the CPU, bus, display, and so forth, to carry out the function. The basic components are known to those of skill in the art and appropriate variations are contemplated depending on the type of device, such as whether the device is a small, handheld computing device, a desktop computer, or a computer server.

Although the exemplary environment described herein employs the hard disk, it should be appreciated by those skilled in the art that other types of computer readable media which can store data that are accessible by a computer, such as magnetic cassettes, flash memory cards, digital versatile disks, cartridges, random access memories (RAMs), read only memory (ROM), a cable or wireless signal containing a bit stream and the like, may also be used in the exemplary operating environment.

To enable user interaction with the computing device 100, an input device 190 represents any number of input mechanisms, such as a microphone for speech, a touch-sensitive screen for gesture or graphical input, keyboard, mouse, motion input, speech and so forth. The input may be used by the presenter to indicate the beginning of a speech search query. The device output 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on the invention operating on any particular hardware arrangement and therefore the basic features here may easily be substituted for improved hardware or firmware arrangements as they are developed.

For clarity of explanation, the illustrative system embodiment is presented as comprising individual functional blocks (including functional blocks labeled as a "processor"). The functions these blocks represent may be provided through the use of either shared or dedicated hardware, including, but not limited to, hardware capable of executing software and hardware, such as a processor, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may comprise microprocessor and/or digital signal processor (DSP) hardware, read-only memory (ROM) for storing software performing the operations discussed below, and random access memory (RAM) for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits.

Figure 2:
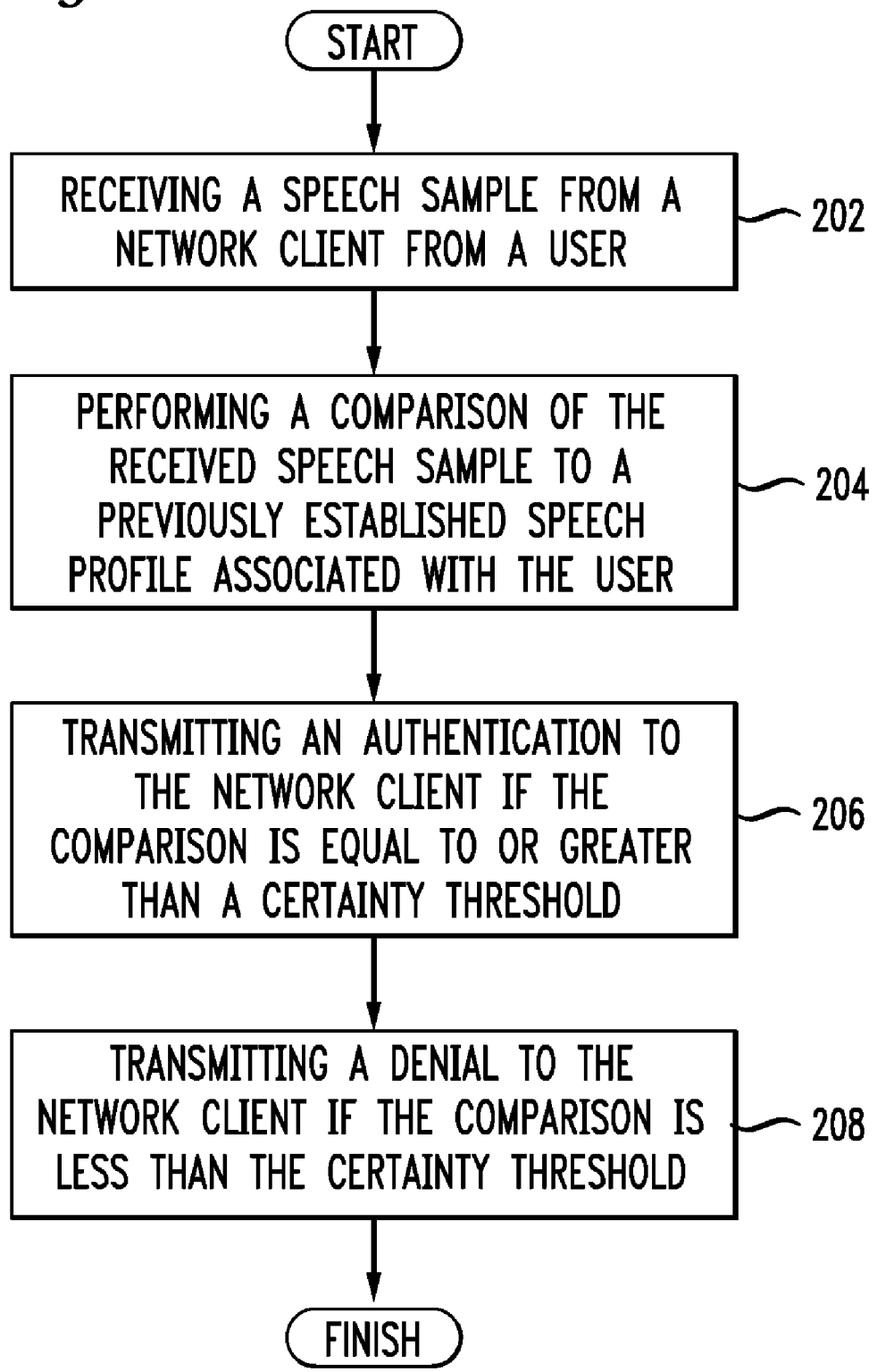
FIG. 2 illustrates an example method embodiment.

Having disclosed some basic system components, the disclosure turns to the exemplary method embodiment for voice authentication as illustrated in FIG. 2. For clarity, the method is discussed in terms of a system configured to practice the invention. The system receives a speech sample from a user through an Internet browser for authentication as part of a request for a restricted-access resource (202). The system can receive the speech sample via Voice over IP (VoIP). The user can capture and send the speech sample with a single user input, such as a single mouse click, finger tap, or shaking a device with an accelerometer. One scenario is a user logging in to a secure online banking site. When the user logs in, the system includes a speech field in addition to or as a replacement for a traditional username and password field. Next to the username and password text fields, the website displays a speech input field. The user can click a button or click in the speech input field to enter a speech sample using a microphone. Such a website can be compatible with nearly any Internet-connected device having a microphone, such as a personal computer, PDA, or smartphone. The website transmits the speech sample to the system over a single communications channel, the Internet, rather than using two separate channels, such as the Internet and a separate phone line. The user can say his password and/or username aloud to generate the speech sample. The user can also read a specified text to generate the speech sample. After the system receives the speech sample, the system performs a comparison of the received speech sample to a previously established speech profile associated with the user (204). In the online banking example, establishing a speech profile can be part of setting up an account. The system transmits an authentication to the network client if the comparison is equal to or greater than a certainty threshold (206). The system transmits a denial to the network client if the comparison is less than the certainty threshold (208).

In one variation, the computing device running the Internet browser preauthenticates the received speech sample before sending the speech sample to the server. The preauthentication can be more relaxed than the server authentication. One reason for this is that a mobile device, for example, has only very modest computing power and may not be able to quickly and accurately perform speech matching to a speech profile. In other situations, the system can make a decision to preauthenticate based on network conditions. For example, if the system detects disruptions in the network connection, it can allow preauthentication on the computing device to conserve or delay bandwidth use.

In one aspect, a received user token must match a previously established user token before the system transmits the authentication to the network client. The user token can be a username and/or password combination, an identification card, a USB authentication device, an iris scan, a fingerprint, or other authentication token. The system can authenticate the token first before authenticating the speech.

In one variation, the system attempts to resolve poor speech recognition attempts by sending to the user with a prompt for an additional speech sample due to feigned poor speech recognition if the comparison is less than the certainty threshold, receiving the additional speech sample from the user, performing a second comparison of the additional received speech sample to the previously established speech profile associated with the user, and transmitting an authentication to the network client if the second comparison is equal to or greater than a certainty threshold. An illustration of this is a user who provides a speech sample to the system. The system cannot authenticate the speech sample, but determines that the speech sample is close to the minimum threshold. The system can act as if the speech sample was garbled or not properly received and prompt the user for a second sample that is clearer, slower, or louder. The system can then compare the second speech sample and authenticate the user if the second speech sample is above the threshold. Such situations can occur due to the natural variations of human voices. For instance, if the user's initial speech sample was recorded while the user had a frog in his throat, the recognition may not succeed. However, after the user clears his throat and sends a second speech sample, the system can successfully authenticate the user.

Figure 3:
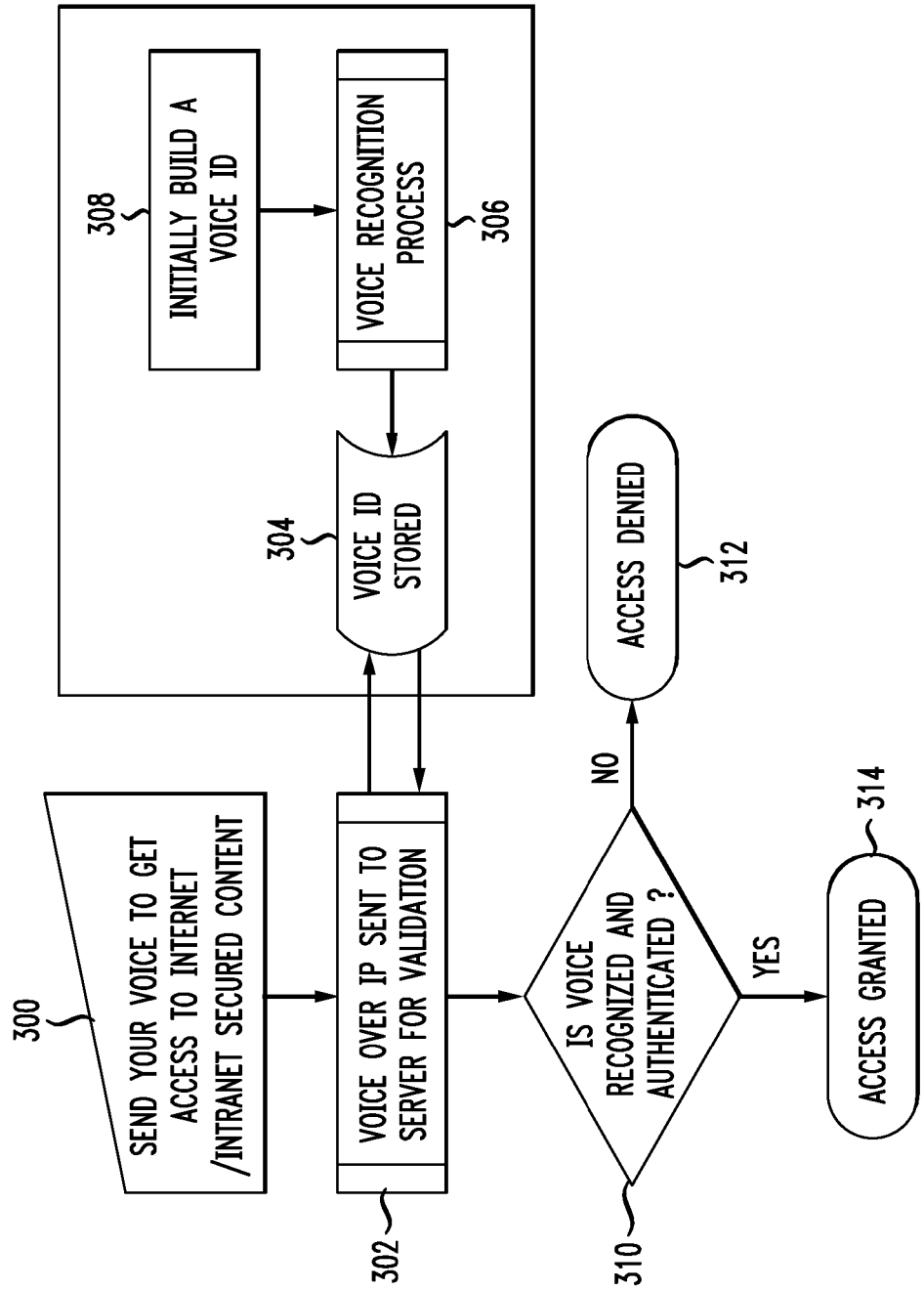
FIG. 3 illustrates an example password validation flow.

FIG. 3 illustrates an example password validation flow. The user first sends his voice to get access to Internet or intranet secured content 300. The user can send his voice via a phone call or as an integrated part of a web browser. For example, a website can include a button next to the traditional username and password fields which allows the user to easily capture and transmit a voice sample to a validation server. The system sends the voice over IP to a server for validation 302. Although VoIP is one common voice transport protocol, the system can user other protocols as well. The server stores a voice ID 304 based on the received voice sample from the user. The server recognizes 306 the speech and attempts to match it to a previously built voice ID 308. The server passes results back to the system. The system determines if the voice was recognized and if the voice was authenticated 310. The system performs these checks to verify that the voice belongs to a recognized person and to verify that the recognized person has authority or permission to access restricted content. If these checks are not satisfied, the system denies access 312. If these checks are satisfied, the system grants access 314. Some examples of restricted access resources are an online banking website, a stock trading website, an online photo album, a blog, or a website administration page.

In one aspect, when the system encounters a voice it cannot initially authorize, the system feigns a bad voice recognition result and requests a second voice sample. For example, if the system prompts the user to say "Swordfish", but the voice sample from the user is not authenticated, the system can further prompt the user "Sorry, I didn't understand your request. Please say 'Swordfish' again." The system does not inform the user that the voice-based authorization failed, but still gathers a second voice sample. Often, due to the feigned prompt, the user will speak more clearly or slowly for the second voice sample. The system can then attempt a second authorization based on the second voice sample.

The principles described herein can operate in a mobile computing context using WiMAX, EDGE, or 3G for network communications. The system can communicate voice using Voice over XML to support input and output of voice over the same channel as HTTP requests. In this way, the user can occupy only a single channel, the Internet, for day to day transactions instead of two channels such as the Internet and a phone line.

In one aspect, the system prompts the user to utter a specific keyword which can either be static or dynamic. The system can prompt the user to say a word displayed on the screen or a username, for example. The system can prompt the user to utter the keyword without displaying a printed version of the word on a screen. For example, the system can prompt the user "What is your birth month?" or "What is your mother's maiden name?" The user can click a button and say the requested keyword. In one embodiment, the system applies speech recognition to transcribe the user utterance and populate a speech recognition field or otherwise display the speech recognition result.

Embodiments within the scope of the present invention may also include computer-readable media for carrying or having computer-executable instructions or data structures stored thereon. Such computer-readable media can be any available media that can be accessed by a general purpose or special purpose computer, including the functional design of any special purpose processor as discussed above. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, data structures, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the invention. For example, the principles herein may be applied to a banking website, a social networking website, school registration website, or any other online application (WWW-based or otherwise) which requires authentication. The principles described herein can be used alone or in concert with other authentication schemes such as a username/password combination or other biometric authentication. Those skilled in the art will readily recognize various modifications and changes that may be made to the present invention without following the example embodiments and applications illustrated and described herein, and without departing from the true spirit and scope of the present invention.

I claim:

1. A computer-implemented method of voice authentication, the method comprising:

receiving, via a processor of a network client, a speech sample from a user through an Internet browser for authentication as part of a request for a restricted-access resource;

preauthenticating the speech sample at the network client running the Internet browser;

performing a comparison of the received speech sample to a previously established speech profile associated with the user;

transmitting an authentication to the network client if the comparison is equal to or greater than a certainty threshold; and transmitting a denial to the network client if the comparison is less than the certainty threshold.

2. The computer-implemented method of claim 1, wherein the user captures and sends the speech sample with a single user input.

3. The computer-implemented method of claim 1, wherein the network client running the Internet browser preauthenticates the received speech sample before sending the speech sample to a server.

4. The computer-implemented method of claim 3, wherein the preauthentication performed at the network client is more relaxed than the authentication performed at the server.

5. The computer-implemented method of claim 1, wherein a decision to preauthenticate is based on network conditions.

6. The computer-implemented method of claim 1, further comprising receiving a user token and transmitting the authentication to the network client when the user token matches a previously established user token.

7. The computer-implemented method of claim 1, the method further comprising:

sending to the user a prompt for an additional speech sample due to feigned poor speech recognition if the comparison is less than the certainty threshold;

receiving the additional speech sample from the user;

performing a second comparison of the additional received speech sample to the previously established speech profile associated with the user; and transmitting the authentication to the network client if the second comparison is equal to or greater than a certainty threshold.

8. The computer-implemented method of claim 1, wherein the received speech sample is a password.

9. The computer-implemented method of claim 1, wherein the user reads specified text to generate the speech sample.

10. A system for voice authentication, the system comprising:

a module configured to receive, via a processor of a network client, a speech sample from a user through an Internet browser for authentication as part of a request for a restricted-access resource;

a module configured to preauthenticate the speech sample at the network client running the Internet browser;

a module configured to perform a comparison of the received speech sample to a previously established speech profile associated with the user;

a module configured to transmit an authentication to the network client if the comparison is equal to or greater than a certainty threshold; and a module configured to transmit a denial to the network client if the comparison is less than the certainty threshold.

11. The system of claim 10, wherein the user captures and sends the speech sample with a single user input.

12. The system of claim 10, wherein the network client running the Internet browser preauthenticates the received speech sample before sending the speech sample to a server.

13. The system of claim 10, further comprising a module configured to receive a user token and transmitting the authentication to the network client when the user token matches a previously established user token.

14. The system of claim 10, the system further comprising:

a module configured to send to the user a prompt for an additional speech sample due to feigned poor speech recognition if the comparison is less than the certainty threshold;

a module configured to receive the additional speech sample from the user;

a module configured to perform a second comparison of the additional received speech sample to the previously established speech profile associated with the user; and a module configured to transmit the authentication to the network client if the second comparison is equal to or greater than a certainty threshold.

15. A tangible non-transitory computer-readable medium storing a computer program, which upon execution on a processor, causes the processor to perform steps for voice authentication, the steps comprising:

receiving, via the processor of a network client, a speech sample from a user through an Internet browser for authentication as part of a request for a restricted-access resource;

preauthenticating the speech sample at the network client running the Internet browser;

performing a comparison of the received speech sample to a previously established speech profile associated with the user;

transmitting an authentication to the network client if the comparison is equal to or greater than a certainty threshold; and transmitting a denial to the network client if the comparison is less than the certainty threshold.

16. The tangible computer-readable medium of claim 15, wherein the user captures and sends the speech sample with a single user input.

17. The tangible computer-readable medium of claim 15, wherein the network client running the Internet browser preauthenticates the received speech sample before sending the speech sample to a server.

18. The tangible computer-readable medium of claim 17, wherein the preauthentication performed at the network client is more relaxed than the authentication performed at the server.

19. The tangible computer-readable medium of claim 15, wherein a decision to preauthenticate is based on network conditions.

20. The tangible computer-readable medium of claim 15, the method further comprising:

sending to the user a prompt for an additional speech sample due to feigned poor speech recognition if the comparison is less than the certainty threshold;

receiving the additional speech sample from the user;

performing a second comparison of the additional received speech sample to the previously established speech profile associated with the user; and transmitting the authentication to the network client if the second comparison is equal to or greater than a certainty threshold.

* * * * *